US008207858B2

(12) United States Patent
Knopf et al.

(10) Patent No.: US 8,207,858 B2
(45) Date of Patent: Jun. 26, 2012

(54) MONITORING SYSTEMS AND METHODS FOR ENSURING A PROPER USE OF PERSONAL PROTECTIVE EQUIPMENT FOR POTENTIAL HAZARDS PRESENTED TO A PERSON WHILE SERVICING AN ELECTRICAL POWER SYSTEM (75) Inventors: Kevin Michael Knopf, Warson Woods, MO (US); Todd Lottmann, Washington, MO (US)

(73) Assignee: Cooper Technologies Company, Houston, TX (US)

( * ) Notice: Subject to any disclaimer, the term of this patent is extended or adjusted under 35 U.S.C. 154(b) by 279 days.

(21) Appl. No.: 11/890,695

(22) Filed: Aug. 7, 2007

(65) Prior Publication Data

US 2009/0040014 A1    Feb. 12, 2009

(51) Int. Cl.
*G08B 23/00*    (2006.01)
(52) U.S. Cl. ......... 340/573.1; 340/5.1; 340/5.2; 340/5.7
(58) Field of Classification Search ............... 340/5.1, 340/825, 500, 540, 5.7, 5.2, 572.1, 568.1, 340/5.21, 573.1–573.7, 5
See application file for complete search history.

(56) References Cited

U.S. PATENT DOCUMENTS

| | | | |
|---|---|---|---|
| 4,656,463 A | 4/1987 | Anders et al. | |
| 4,827,395 A | 5/1989 | Anders et al. | |
| 4,983,954 A | 1/1991 | Huston | |
| 5,136,463 A * | 8/1992 | Webster | 361/622 |
| 5,164,707 A * | 11/1992 | Rasmussen et al. | 340/551 |
| 5,309,571 A | 5/1994 | Huang | |
| 5,315,289 A * | 5/1994 | Fuller et al. | 340/532 |
| 5,317,309 A | 5/1994 | Vercellotti et al. | |
| 5,673,037 A | 9/1997 | Cesar et al. | |
| 5,682,142 A | 10/1997 | Loosmore et al. | |
| 5,732,401 A | 3/1998 | Conway | |
| 6,853,303 B2 * | 2/2005 | Chen et al. | 340/573.1 |
| 6,897,783 B2 | 5/2005 | Zeng et al. | |
| 7,142,118 B2 | 11/2006 | Hamilton et al. | |
| 7,323,988 B2 * | 1/2008 | Krstulich | 340/572.1 |
| 7,327,252 B2 | 2/2008 | Goehler | |
| 7,417,547 B2 | 8/2008 | Kennedy | |
| 7,633,387 B2 * | 12/2009 | Carmichael et al. | 340/539.13 |
| 2004/0100384 A1 | 5/2004 | Chen et al. | |
| 2005/0114154 A1 * | 5/2005 | Wolkowicz et al. | 705/1 |
| 2005/0148339 A1 * | 7/2005 | Boman et al. | 455/456.1 |
| 2005/0231320 A1 * | 10/2005 | Ackermann | 337/206 |
| 2006/0077609 A1 | 4/2006 | Bender et al. | |
| 2006/0087397 A1 | 4/2006 | Henricks et al. | |
| 2006/0087785 A1 | 4/2006 | Bender et al. | 361/93.1 |
| 2006/0125623 A1 * | 6/2006 | Appelt et al. | 340/521 |
| 2006/0208857 A1 | 9/2006 | Wong | |
| 2006/0268482 A1 * | 11/2006 | Lin et al. | 361/62 |
| 2006/0273894 A1 * | 12/2006 | Goehler | 340/539.13 |

(Continued)

OTHER PUBLICATIONS

International Search Report for PCT/US08/70927; Oct. 1, 2008; 8 pages.

*Primary Examiner* — Brian Zimmerman
*Assistant Examiner* — An T Nguyen
(74) *Attorney, Agent, or Firm* — Armstrong Teasdale LLP (57) ABSTRACT

Electronic systems and methods utilizing such systems for detecting and verifying the adequacy of personal protective equipment needed by a person in light of a potential arc flash hazard presented by an electrical power system.

22 Claims, 7 Drawing Sheets

U.S. PATENT DOCUMENTS

| | | |
|---|---|---|
| 2007/0008138 A1 | 1/2007 | Mosher, Jr. et al. |
| 2007/0182556 A1 | 8/2007 | Rado |
| 2007/0242402 A1* | 10/2007 | Papallo et al. .................. 361/63 |
| 2007/0250411 A1 | 10/2007 | Williams |
| 2008/0007404 A1 | 1/2008 | Albert et al. |
| 2008/0030359 A1 | 2/2008 | Smith et al. |
| 2008/0081516 A1 | 4/2008 | Brandt et al. |
| 2008/0088447 A1 | 4/2008 | Flores et al. |
| 2008/0088454 A1 | 4/2008 | Flores et al. |
| 2008/0093932 A1 | 4/2008 | Whitt et al. |
| 2008/0136649 A1 | 6/2008 | Van De Hey |
| 2009/0040014 A1* | 2/2009 | Knopf et al. .................. 340/5.1 |
| 2010/0188187 A1* | 7/2010 | Mughal et al. ................ 337/225 |

* cited by examiner

MONITORING SYSTEMS AND METHODS FOR ENSURING A PROPER USE OF PERSONAL PROTECTIVE EQUIPMENT FOR POTENTIAL HAZARDS PRESENTED TO A PERSON WHILE SERVICING AN ELECTRICAL POWER SYSTEM

BACKGROUND OF THE INVENTION

This invention relates generally to protective gear for persons working in and around hazardous locations, and more specifically to monitoring and detection systems to ensure appropriate use of protective gear.

It is sometimes necessary in a variety of industries for workers to enter potentially hazardous environments. To protect the human body from such hazards, various types of personal protective equipment (PPE) have been developed to reduce a likelihood of worker injury on the job. Governmental regulations are now in place that require certain employees to be trained in the proper use of appropriate protective equipment and to use the equipment effectively in working environments that call for them. Despite proper training in the use of such gear, however, a risk remains that workers in the field will not use the appropriate equipment, either intentionally or inadvertently, in certain hazardous environments. Managing such risks is of particular concern to employers.

SUMMARY

In one aspect of the present invention, a system is provided for monitoring the proper use of personal protective equipment used by persons in a potentially hazardous work site. The system includes a sensor tag coupled to at least one item of the personal protective equipment and a detector configured to communicate with the sensor tag. A processor-based device is configured to determine, based upon a detected characteristic of the sensor tag, whether the personal protective equipment is sufficient to commence work at the work site.

In one embodiment, the sensor tag can include an inductor assembly. In another embodiment the detected characteristic comprises a resonant frequency of the sensor tag. The detector comprises a radio frequency identification (RFID) reader. In another embodiment the detector communicates wirelessly with the sensor tag. In yet another embodiment, the system further includes a lockout device preventing physical access to the worksite unless the personal protective gear is determined to be sufficient.

In another embodiment, the personal protective gear is one of a hard hat, a face shield, a flame resistant neck protector, an ear protector, a protective suit, an insulated rubber glove, and an insulated piece of footwear. In yet another embodiment, the system further includes a display which presents information corresponding to the personal protective equipment. In another embodiment, the personal protective equipment includes items of different grades corresponding to a risk assessment of the work site, the detected characteristic of the sensor tag identifying the grade of the personal protective equipment.

In another aspect, the present invention provides a method of ensuring the proper use of adequate personal protective equipment at a job site. The method includes the steps of: providing personal protective equipment having at least one sensor tag, detecting the presence of the sensor tag with an electronic system, the system detecting at least one characteristic of the sensor tag, comparing the detected characteristic to a baseline characteristic with the electronic system, and if the detected characteristic and the baseline characteristic match, electronically confirming that the personal protective equipment is adequate for the level of risk to a worker at the job site.

In one embodiment, confirming that the personal protective equipment is adequate comprises operating a lockout device to provide physical access to the workspace. In another embodiment, the method further includes the steps of accepting a task code for a task to be performed at the job site and recommending a level of personal protective equipment needed for the task. In yet another embodiment, the method further includes the steps of analyzing the job site in light of a potential hazard and assigning a level of personal protective equipment to be worn at the job site based on the analysis of a potential hazard.

In another aspect, the present invention provides a method for determining overall safety of a plurality of individuals in a hazardous equipment. The method includes the steps of: providing a plurality of individuals personal protective equipment (PPE) having at least one sensor tag, wherein the sensor tag identifies a level of protection provided by the PPE, providing individual sensor tags for plurality of individuals, determining the proximity of each individual to hazardous equipment, and determining if the PPE being worn by each individual is adequate based upon the individuals proximity to the hazardous equipment.

In another aspect, the present invention provides a system for determining the presence of proper use of personal protective equipment comprising: means for identifying the level of personal protective equipment, means for detecting the level of personal protective equipment, and means for determining whether the level of personal protective equipment is adequate for the individual.

In one embodiment, the identifying means include an RFID tag. In another embodiment, the detecting means include an RFID sensor.

DETAILED DESCRIPTION OF THE INVENTION

In a first aspect, exemplary methods and systems for ensuring appropriate use of personal protective equipment by workers are disclosed herein that detect and determine the presence and adequacy of personal protective equipment associated with a particular task before workers are exposed to potentially hazardous environments. In a second aspect, exemplary methods and systems for controlling access to specified workspaces or equipment are provided. In order to appreciate the invention to its fullest extent, the following disclosure will be presented in parts, wherein Part I discusses challenges that employers face in ensuring that proper personal protective equipment is properly used; Part II discusses exemplary systems and methods for ensuring the use of personal protective equipment and for controlling access to certain workspace areas; and Part III discusses exemplary inductor assemblies for ensuring the proper use of personal protective equipment.

I. Introduction to the Invention

It is a practical reality, in certain industries, that exposure of at least some workers to hazardous, or potentially hazardous, working conditions cannot be avoided. As one example, workers in the electrical industry, and more specifically those working in and around electrical power systems, must be trained in the appropriate use of personal protective equipment to mitigate possible electrical hazards with which they may face.

Aside from hazards associated with electrical shock and electrocution when human flesh is brought into contact with energized conductive components, electrical arc flash incidents are of particular concern. Electrical arcing, or current flow between two or more separated energized conductors, may be experienced when installing, servicing, and maintaining electrical systems. Arcing may occur from electrical fault conditions and can release significant amounts of concentrated radiant energy at the point of arcing in a fraction of a second, resulting in high temperatures that may burn persons exposed to them. Additionally, arcing conditions may produce pressure blasts that are more than sufficient to knock nearby workers off their feet, and shrapnel may be generated by the blast.

Aside from fault conditions, arcing may result from human error including dropping of tools onto energized conductors, accidental contact with electrical systems, improper work procedures, and insulation failure of components used in the electrical systems, including but not limited to cables that interconnect electrical components and equipment. A build-up of dust, impurities and corrosion on insulating surfaces may also contribute to arcing conditions. Sparks generated during operation of circuit breakers, during replacement of fuses, and closing electrical connections on faulted lines may also produce an arc. Damage to components and equipment from rodents and pest infestations may result in arcing conditions. Considering the number of potential causes of electrical arcing, instances of electrical arcing are not predictable.

Accordingly, personal protective equipment that is adequate or sufficient to provide at least a minimum level of protection to persons against potential electrical hazard has been developed for practically the entire human body, such as for example, shock, arc flash and arc blast. For example, persons wearing such personal protective equipment may be reasonably protected from potentially hazardous arc flash incidents and may avoid or reduce the likelihood of serious injury if such an arc flash incident occurs. Examples of personal protective equipment may include a hard hat, a face shield, a flame resistant neck protector, ear protectors, a Nomex™ suit, insulated rubber gloves with leather protectors, and insulated leather footwear. Insulated tools may also be provided to complete certain tasks. Such personal protective equipment may be fabricated from various materials to provide, among other things, thermal insulation protection to prevent severe burns to human flesh during high temperature arcing conditions, and to mitigate pressure blasts and shrapnel to avoid life-threatening wounds to a worker's head and torso if arcing conditions were to occur.

The amount, type and quality of personal protective equipment necessary for a particular task in an electrical power system will vary according to the potential arc hazard of the worker for different tasks. For example, in the case of electrical fuses that need replacement under energized circuit conditions, fuses of higher electrical ratings may pose a greater risk than fuses of lower electrical ratings, and different amounts or types of personal protective equipment may be required for replacing one fuse, for example, than for replacing another fuse.

The selection of the required thermal rating of personal protective equipment depends on the incident energy level at the point of work. Flash energy analysis is typically required as a threshold inquiry to determine the arc flash boundary and incident energy level, and a thermal level of the personal protective equipment is matched accordingly with the calculated flash energy. Formulas for conducting the arc flash analysis are known and published for example, in the Institute of Electronic and Electrical Engineers (IEEE) Std. 1584 and the National Fire Protection Association (NFPA) 70E. To properly estimate arc flash exposure hazards, the maximum bolted short-circuit current, the arcing fault current, an operating time of an arc fault interrupting element associated with the point of interest, and a distance from an expected arc to the worker must be determined. In general, incident energy increases as the arc time and fault current increases. Software is available for analyzing arc flash exposure that may be used to determine suitable thermal ratings for particular tasks.

Personal protective equipment may provided in different levels or grades having different thermal insulation properties and ratings to meet specific needs. That is, multiple sets of personal protective equipment may be available with ranging insulating or thermal properties required for certain work sites. Thermal properties may be increased, for example, with material selection used to fabricate the personal protective equipment, by using heavier fabrics, by introducing additional layers of fabric and materials into the personal protective equipment, and by other methods known in the art. A low grade of personal protective equipment may therefore be worn for jobs that pose arcing concerns of lower intensity and a higher grade of equipment may be worn for jobs that pose greater concerns of arcing concerns. Because of the different grades of personal protective equipment, there is at least some risk that the user may choose the wrong grade of personal protective equipment needed for a particular job, which can have particular consequences if the grade of personal protective equipment utilized is less than desired or necessary. Potential confusion regarding which type or grade of the personal protective equipment should be worn is of particular concern. Preferably, personal protective equipment is required regardless of whether power has been turned off to a particular area, or to a particular piece of equipment which is scheduled for service.

Managing inventories of personal protective equipment, including the various grades thereof, for large electrical systems and a large number of workers is difficult, and facilities management must in general rely on its employees to locate and use the proper type and grade of personal protective equipment for each situation encountered. However, even conscientious workers may make mistakes, and the occasional stubborn worker that refuses to wear the proper personal protective equipment for a given task puts himself and potentially others at risk. It would be desirable to provide an effective way to monitor and detect the proper use of personal protective equipment for hazardous work environments such as those encountered in electrical power systems.

II. Exemplary Inventive Systems and Methods

Exemplary sensor systems are described herein that in one embodiment include sensor devices, sometimes referred to as sensor tags, that are embedded in personal protective equipment. When used with a detection system, the sensor tags and associated personal protective equipment may be detected, monitored and electronically verified as being appropriate or inappropriate for a given task or for a selected work site. Persons not wearing the proper personal protective equipment, as determined by the system may be denied access to locations wherein a level of personal protective equipment is insufficient. While the detection and monitoring system is described herein in the context of personal protective equipment for workers in and around electrical power systems, it is to be understood that the system may be equally applicable to other potential hazards and other types of personal protective equipment needed in both electrical and non-electrical systems. Non-electrical hazards such as chemical hazards and hazards associated with mechanical machinery, for example, may also benefit significantly from the systems and methods described below for ensuring the proper use of protective equipment and protective gear for workers.

Figure 1:
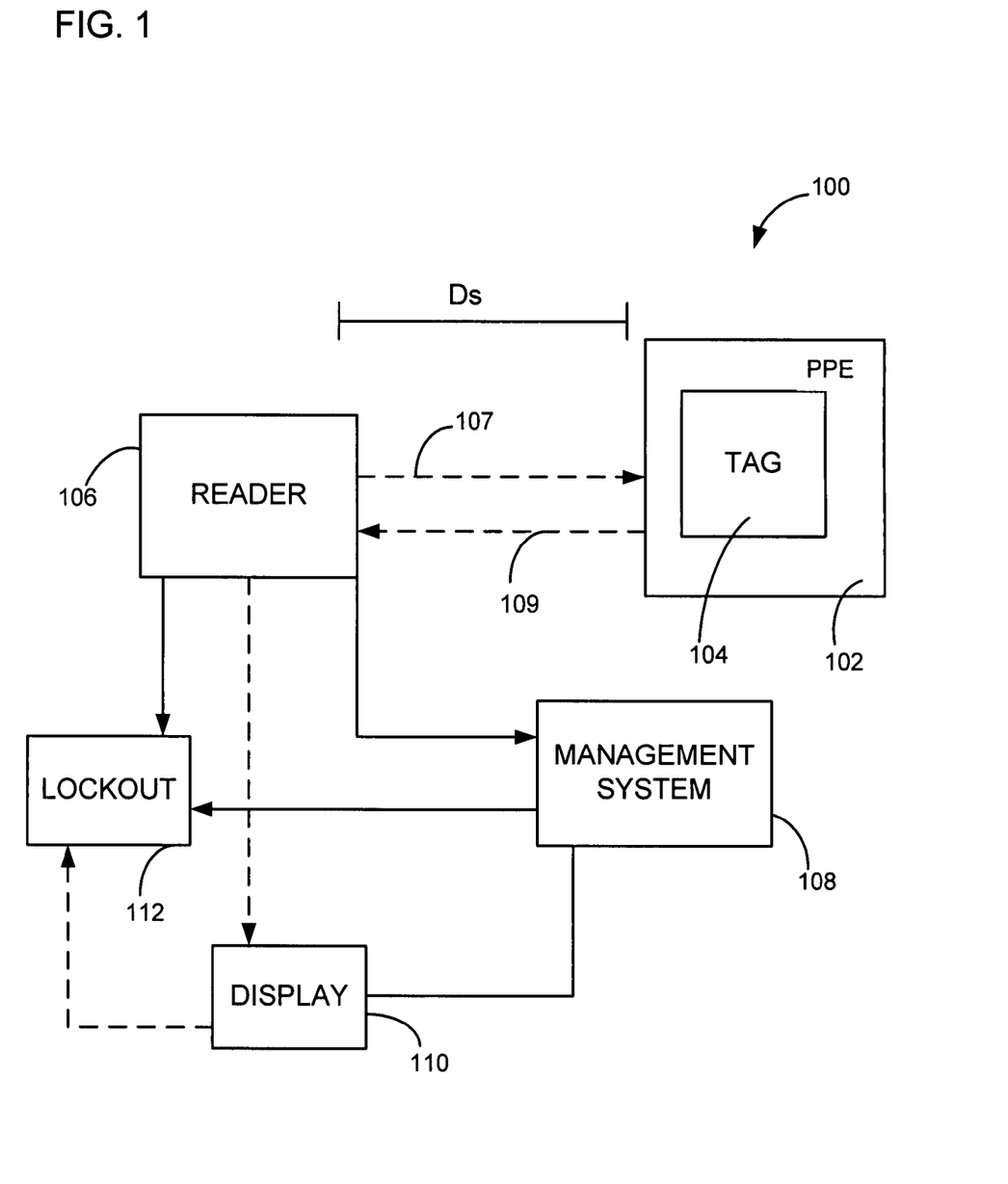
FIG. 1 is a schematic diagram of a system for ensuring the proper use of protective gear for potentially hazardous work environments.

FIG. 1 is a schematic diagram of an exemplary system 100 for ensuring the proper use of personal protective equipment by workers exposed to potentially hazardous environments, such as electrical workers that may be exposed to potential electrical arcing conditions. As shown in FIG. 1, the system 100 may include personal protective equipment 102 provided with a relatively low cost inductor assembly, often referred to as a sensor tag 104. The personal protective equipment 102 may in an exemplary embodiment include, but is not limited to, one or more of: a hard hat, a face shield, a flame resistant neck protector, ear protectors, a Nomex™ suit, insulated rubber gloves with leather protectors, and insulated leather footwear. A sensor tag 104 may be provided in each item or piece of personal protective equipment 102, or in a representative item of the personal protective equipment 102.

As previously mentioned, different grades or levels of personal protective equipment 102 may be provided by an employer for use by workers. In one embodiment, various levels of personal protective equipment may be provided that correspond to different levels of thermal insulation each corresponding to a different severity or intensity of arc flash that may be encountered in a particular electrical system. The personal protective equipment 102 may be accordingly grouped into sets wherein each set includes a complete group or set of personal protective equipment 102 meeting specific thermal requirements, padding and protection, etc. for tasks corresponding to one of the designated severity levels of arc flash. Each set can include items of personal protective equipment for different parts of the worker's body that are to be used in combination with one another, such as, for example, a hard hat, a face shield, a flame resistant neck protector, ear protectors, a Nomex™ suit, insulated rubber gloves with leather protectors, and insulated leather footwear. The sets may be identifiable by workers for example, with labels, tags, graphics, colors, or indicia that identify a level or grade of particular gear.

For example, the different pieces or items of gear may be labeled with numbers on the understanding that workers would only don personal protective equipment 102 having numbers that match one another, and that match the severity or risk level for the job to be undertaken. As another example, the personal protective equipment 102 may be color coded so that orange equipment, for example, may correspond to one severity level, yellow equipment may corresponds to another level, and still other colors of equipment are provided for the remaining levels. Various other coordination schemes may be utilized to demarcate and distinguish one grade of personal protective equipment 102 from another.

In one embodiment, for each set of personal protective equipment 102, one representative item, such as the right hand glove, may be provided with the sensor tag 104. In another embodiment, sensor tags 104 may be provided in each and every piece of personal protective equipment 102 available for use. The sensor tags 104 may be, for example, embedded in layers of fabric in the personal protective equipment, sewn or stitched within the personal protective equipment 102, or otherwise, affixed, secured and attached to the personal protective equipment.

The sensor tag 104 may communicate across an air interface with another device, typically referred to as a reader or interrogator 106. Communication between the reader 106 and the sensor tag 104 may occur via radio frequency signals, and the system 100 may operate according to what is commonly known as a radio frequency identification (RFID) system operating on close proximity electromagnetic or inductive coupling of the reader 106 and sensor tag 104, or alternatively operating using propagating electromagnetic waves. The reader 106, by virtue of the sensor tag 104 present in the protective equipment 102 may detect the presence of, or the type or grade of, the personal protective equipment 102 that is present.

More specifically, the reader 106 may be configured or adapted to communicate with the sensor tag 104 via, for example, wireless radio frequency (RF) signals. In accordance with known systems, such as RFID systems, the reader 106 can generate a signal 107 that excites an inductor coil, described below, of the sensor tag 104 and causes it to resonate at a predetermined frequency. The sensor tag 104 can provide a return signal 109 to the reader 106 at the resonant frequency. Thus, by generating signals 107 and collecting return signals 109, the reader 106 may detect the sensor tag 104 and the associated personal protective equipment 102. The reader 106 and the sensor tag 104 may communicate over an air interface and special separation of a distance $D_S$ that is, for example, 12 to 18 inches, 18 to 24 inches, 24 to 36 inches, up to 4 feet, up to 5 feet, up to 6 feet, up to 7 feet, up to 8 feet, up to 9 feet, or up to 10 feet. Methods of transmission over long distances may be dependent upon the use of a stronger antenna signal, which is known in the art, and also considered for use in the present invention.

The sensor tags 104 for different levels of the personal protective equipment 102 may be fabricated to provide a different frequency response for each level or grade of equipment. By reading the frequency response of the sensor tag or tags 104, the reader 106 and an associated computer system, referred to as a management system 108 in FIG. 1, may monitor the presence or absence of adequate personal protective equipment 102 for a particular task. The management system 108 in an exemplary embodiment may be a processor-based device such as a personal computer or notebook computer programmed in a manner to achieve the functionality described below.

In one embodiment, the sensor tags 104 can be formed in a manner, explained below, that provides sufficient signal strength for reliable signal transmission and detection of the personal protective equipment 102 by the reader 106 within the spatial distance $D_S$. The reader 106 may be a processor-based hand-held device that may be used in a scanning motion over the personal protective equipment 102, or the reader 106 may be mounted in a fixed or stationary location with one or more items of the personal protective equipment passed before it to detect the sensor tags 104. The reader 106 may be a conventional reader device, such as a known non-optical reader used in, for example, conventional RFID systems or other electromagnetic detection systems that are well known. If desired, intelligence may be implemented in the reader 106 and sensor tag 104, and a communications protocol may be established so that the system 100 may be utilized for purposes other than simple detection of the sensor tag 104. Depending upon the sophistication of the communications protocol, the sensor tag 104 may be specifically identified by the reader 106 and data may even be exchanged between the sensor tag 104 and the reader 106 via the signals 107 and 109.

In one embodiment, more than one reader device 106 may be provided in different locations, with each location selected to detect protective gear for specific parts of the body. In such an embodiment the personal protective equipment 102 may be worn by a worker and the worker may be required to walk through a screen or gate having a reader 106 mounted near the floor to detect protective footwear, a reader 106 mounted at about the level of a worker's waist to detect the presence of protective overalls or a jacket, and a reader 106 mounted at the worker's eye level to detect the presence of a hardhat or face shield. Providing various readers 106 at varying locations and elevations may allow simultaneous detection and analysis of a full spectrum of protective equipment that is actually being worn by a user. That is, each item of protective equipment in a set of protective gear may be specifically identified and verified as being the proper grade for a given task to be performed in an electrical system. Depending on the location of the sensor tags 104 in the personal protective equipment 102 and on the position of the readers 106, more than one sensor tag 104 may be detected by the same reader 106.

Alternatively, a single reader 106 may be used to identify a single sensor tag 104 located only in a representative item of personal protective equipment 102, such as a glove. It would be assumed in such a scenario that if the grade of the representative item is determined to be proper, a worker would employ the complete set of personal protective items of the same grade.

In different embodiments, the reader or readers 106 may be located in a room, for example, wherein the personal protective equipment 102 is stored, may be located at an access point such a door beyond which the personal protective equipment 102 must be worn, or may be located at the job site itself. As one example, a reader 106 may be located on an electrical panel door providing access to certain circuit protectors such as fuses in an electrical system.

The reader 106 and/or the management system 108 may be programmed with a look up table, for example, of a variety of tasks, the severity level of potential hazards such as arc flash associated with each task, and the level of personal protective equipment 102 that is appropriate for each task. The look up table in one example includes a comprehensive list of fuses utilized in an electrical system, a task code for each fuse, a severity level for arc flash events for each fuse if they were to occur, and a recommended level of personal protective equipment 102 when servicing each fuse. When an open fuse event occurs, for example, the worker may enter a task code corresponding to the fuse needing replacement to either the reader 106 or the management system 108, and using the look up table the reader 106 may determine whether the frequency response from the sensor tags 104 in the personal protective equipment 102 matches the expected frequency response for the specified level of the personal protective equipment needed for the task.

In an exemplary embodiment, the table of tasks and corresponding personal protective equipment 102 may be posted on the wall of a room, for example, where the personal protective equipment 102 is stored, which the worker may consult to enter a task code for use by the reader 106 and the management system 108. A display 110 may be associated with the reader 106 and/or the management system 108 to provide for visual confirmation of the task code, as well as to present additional information and instruction to the user for safe completion of the task. The display 110 may be a touch screen or touch sensitive panel in which the user may select a task to be accomplished. After selecting a task, the display 110 may direct the user to a storage locker, for example, wherein the proper personal protective equipment may be found. Additionally, when presented to the reader 106, detected protective gear may be communicated to the user via the display 110, and indication may be provided whether or not the proper protective equipment 102 has been selected.

For at least the reasons set forth above, the system 100 may effectively determine whether a worker has located personal protective equipment 102 that matches the requirements associated with the task at hand. Potential confusion and mismatching of personal protective equipment 102 may be largely, if not completely, corrected by the system 100 before the worker is exposed to potentially hazardous conditions such as arc flashing.

For still further assurance of safety of the worker or workers, the reader 106 and/or the management system 108 may communicate with a lockout device 112 that physically prevents access to potential hazards unless the proper protective gear is present and properly utilized. For example, the lockout device may be implemented as a locked door of an equipment room, with the door lock being controlled by the reader 106 and/or the management system 108. In such a scenario, the worker who does not have the proper protective equipment 102, as determined by the system 100, may not pass through the door to gain access to circuitry and fuses, for example, that could present an arc flash event. As another example, the lockout device could be implemented in a locking mechanism of a door of an electrical panel, and unless the proper protective equipment 102 is determined by the system, the door of the panel may not be opened to access circuitry and one or more circuit protector such as fuses. Various locking mechanisms are known that could be remotely controlled and actuated by the management system 108, any of which may be used as the lockout device 112. In one embodiment, instructions from the lockout device 112 may be overridden. In another embodiment, the lockout device 112 may be programmed to override a "lock out" event, based upon the personal protective equipment that is being worn, the identity of the worker, the conditions of the "locked" work space, or a combination of the above.

The override system can be programmed to function in response to the identity of a particular person or event and may be done at the local level or from a remote location. For example, at the local level, i.e., at the location of the equipment to which access is being controlled, there are two levels of override: local manual override and local automatic override. Local manual override requires the input of a code, password, or the like, by an individual, at a user interface located at or in close proximity to the access point or piece of equipment. Local automatic override requires that the system, at the local level, be pre-configured or pre-programmed to override a "lock out" event, based upon some predetermined parameters. Examples of pre-determined parameters include, but are not limited to, the power being disconnected from a piece of equipment to be serviced, the identity of the individual seeking access, adequate (but not ideal) personal protective equipment 102, or some other similar event. Similarly, at the remote level, there are two levels of override: remote manual override and remote automatic override. Remote manual override requires the input of a code, password, or the like, or may provide an option for a manager, or other person having authority, to allow access and override the "lock out" event. Remote automatic override requires that a control system located at a remote location be pre-programmed to override the "lock out" event based upon a person's identity, personal protective equipment 102, training, or other factor.

In still another embodiment, the personal protective equipment 102 may be stored in locked cabinets or lockers that are controlled by the management system 108, and when a task code is input to or otherwise selected by a user, only the cabinets or the lockers containing the proper personal protective equipment 102 may be unlocked for use by workers. The reader 106 in such an embodiment may be used as a verification tool for the equipment stored in the lockers or cabinets, thereby providing a degree of redundancy to the system 100. The reader 106 may also be used as a check-in device after completion of the task to ensure that personal protective equipment 102 is stored in the appropriate locker or cabinet. That is, the reader 106 may detect the level and type of personal protective equipment 102, and unlock only the proper storage lockets, cabinets or containers for the personal protective equipment 102 for storage. The reader 106 and the management system 108 may be utilized in such a manner for inventory tracking purposes by detecting and monitoring a check-in and check-out of personal protective equipment 102. Usage and event histories may be archived in the reader 106 and the management system 108 for access by facility management for further study and analysis.

Figure 2:
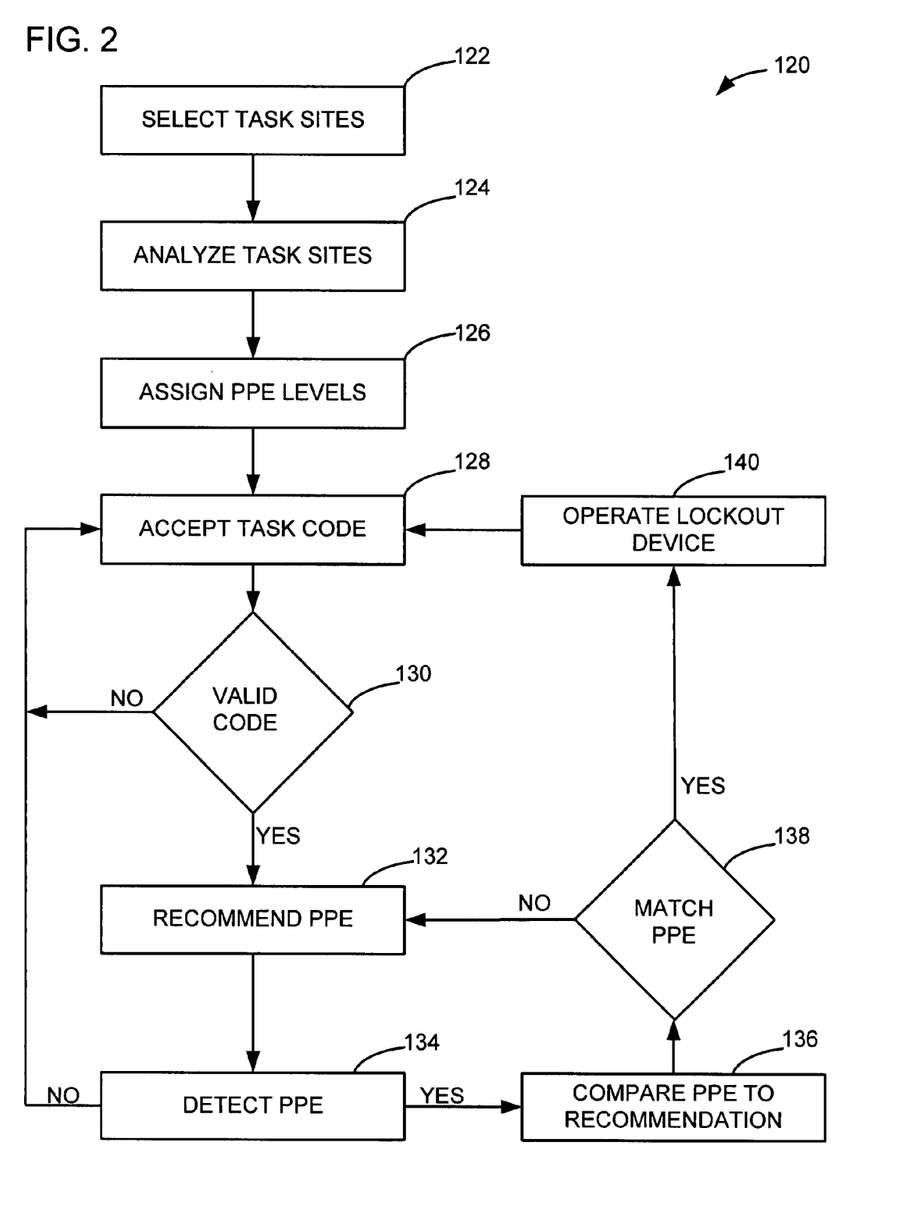
FIG. 2 is a flowchart of a method that is executable by the system shown in FIG. 1.

FIG. 2 illustrates an exemplary method 120 that may be utilized by the system 100 (shown in FIG. 1) in one embodiment. Specifically, the method can be implemented in a processor-based device. As used herein, the term "processor-based device" shall refer to computers, processors, microprocessors, microcontrollers, microcomputers, programmable logic controllers, reduced instruction set (RISC) circuits, application specific integrated circuits and other programmable circuits, logic circuits, equivalents thereof, and any other circuit or processor capable of executing the functions described below. The above examples are exemplary only, and are thus not intended to limit in any way the definition and/or meaning of the term "processor-based device", however processor based device shall specifically include hand-held devices.

In one example, the method may be implemented in a processor-based device including a microcomputer or other processor, and a memory that stores executable instructions, commands, and control algorithms, as well as other data and information required to satisfactorily operate the system as explained below. The memory of the processor-based device may be, for example, a random access memory (RAM), although other forms of memory could be used in conjunction with RAM memory, including but not limited to flash memory (FLASH), programmable read only memory (PROM), and electronically erasable programmable read only memory (EEPROM). The physical implementation of the method 120 may further be accomplished in discrete devices, including but not limited to the reader 106 and the management system 108 described above, or a single device.

The method 120 can include determining or selecting 122 task sites wherein workers will be asked to perform jobs, such as servicing of fuses in an electrical system. Thus, for example, a list of the fuses, the locations of the fuses, and a task code for each fuse may be compiled.

Once the sites are identified and selected 122, the sites may be analyzed 124 to assess the potential hazards or risks that the sites may present to workers. The analysis is performed as a risk assessment of the sites where the tasks are to be performed, and may include, among other things, potential exposure to an arc flash. Arc flash analysis may be conducted according to well known procedures, formulas, and known software packages described above. Incident arc energy exposure at each site, determined as part of the analysis, may then be the basis for assigning personal protective equipment levels 126 for each of the sites identified in step 122. The sites 122 and the assigned personal protective equipment levels from step 126 may then be input or programmed into a processor-based device, which may be the management system 108 (FIG. 1) and/or the reader 106 (also shown in FIG. 1), or still another device. Assigning of the personal protective equipment levels at step 126 may also include designating a unique frequency response for each personal protective equipment level that may be used as baseline reference values by the reader 106 to identify the personal protective equipment level and to distinguish the personal protective equipment 102 levels from one another.

Once the frequency response is determined for each grade of personal protective equipment, sensor tags 104 that exhibit the determined frequency responses may be provided in the personal protective equipment 102 at each level or grade. For each different grade of personal protective equipment that is supplied, a different sensor tag is utilized so that sensor tags 104 in different grades of gear will exhibit different frequency responses.

When a task is to be completed that requires the use of personal protective equipment 102, the system may accept 128 a task code from a user, and may then determine 130 whether the task code corresponds to one of the tasks and sites determined in step 122. At step 128, additional codes and identifiers may be also accepted by the system, including but not limited to worker identification codes and passwords to prevent unauthorized persons from accessing the system.

If the accepted task code at step 128 does not correspond to one of the tasks and sites determined in step 122, the task code is invalid and the user is prompted to enter another task code for acceptance by the system at step 128. If the accepted task code does correspond to one of the tasks and sites determined at step 122, the system may recommend 132 a personal protective equipment level to the user for the user's use in performing the task.

The recommendation at step 132 corresponds to the assigned personal protective equipment level determined for the task site at step 122 that corresponds to the valid task code accepted by the system at step 128. The recommendation may be presented to the user via the display 110 (FIG. 1) or by other audio or visual means. When a user receives the recommendation, the user may proceed to locate the appropriate personal protective equipment 102 and clothe himself or herself in it. The recommendation may also provide confirmation to the user of the task code and the task to be performed, and present an opportunity for the user to enter another task code if an inadvertent error in entering the task code resulted in a valid, but incorrect task code that does not correspond to the task to be performed.

Once the personal protective equipment 102 is located, the user may approach the system reader with the personal protective equipment 102. When the spatial separation between the equipment and the reader is within the operating distance DS (FIG. 1), the personal protective equipment 102 is detected 134 via the sensor tag or tags embedded within the protective equipment. If personal protective equipment 102 is detected at step 134, the system compares 136 the detected personal protective equipment 102 via the resonant frequency of the sensor tag or sensor tags 104 with the baseline frequency to be expected for the specific task in accordance with the assigned personal protective equipment 102 levels at step 126. If at step 138 the detected equipment matches the recommended equipment, the system operates 140 the lockout device so that the worker may obtain access to the job site to complete the task. As used herein, "matches" shall refer to situations wherein the detected resonant frequency of the sensor tags is equal to the expected baseline frequency for the assigned personal protective equipment level, or is within a reasonable tolerance band around the baseline frequency.

An example of a reasonable tolerance band may be a frequency that is plus or minus ten percent of the expected frequency, although other ranges both greater and smaller in percentage terms may be appropriate in some embodiments. Some deviation between the detected frequency and the expected frequency is to be expected and may be tolerated, and the degree of deviation may be largely dependent on the frequency separation between the baseline reference values of the sensor tags 104 for each grade of personal protective equipment. When the baseline reference values are farther apart from one another, a greater amount of deviation between detected frequencies and expected frequencies may be tolerable.

If at step 138 the detected personal protective equipment 102 does not match the recommended personal protective equipment, the system returns to step 132 to recommend the proper personal protective equipment to the user and invite the user to locate the proper personal protective equipment.

If no equipment is detected at step 134, the system may time out after a predetermined lapse of time and return to accept another task code.

Steps 128 through 140 in FIG. 2 may be repeated for each worker needed to complete a task, and all accepted codes, recommendations, detection events, and operation of lockout devices may be recorded in a database or in memory storage on the management system 108, the reader 106 or elsewhere in the system. Detailed histories of both the system performance and user performance in locating and using the proper personal protective equipment 102 may be complied for study and evaluation, as well as for protective inventory equipment tracking and evaluation purposes. Among other things, data collected by the system may be utilized to determined an optimal amount of personal protective equipment for each severity level assigned at step 126 based on actual use requirements. Attempts may also be undertaken, based on data collected by the system, to predict future needs for personal protective equipment.

Manual over-ride features may also be built-in to the system and method to disable the system and method in case of malfunction or wherein operation of the system may frustrate or delay emergency procedures.

The system and method are believed to be relatively straightforward for users to grasp and users may therefore be trained relatively quickly in a short demonstration to personnel who are hired to perform tasks, if necessary, that require personal protective equipment 102.

Varying degrees of sophistication may be provided in the system 100 and method 120 described above. Some of the system features and method steps described above may be considered optional in some embodiments, and other system features and method steps may be added without departing from the scope and spirit of the invention.

In one aspect of the present invention, multiple RFID assemblies can be employed at the same time. In one embodiment, RFID assemblies can be used to identify different individuals wherein each individual is issued a separate and distinct device and signal. In another embodiment, the RFID sensor can be used to detect the identity of multiple individuals and simultaneously determine the level of protective gear being worn by each individuals. In another embodiment, the RFID sensor can be used to detect the identity of multiple individuals and simultaneously determine if the proper protective gear is being worn based upon the workspace each individual is entering.

Figure 6:
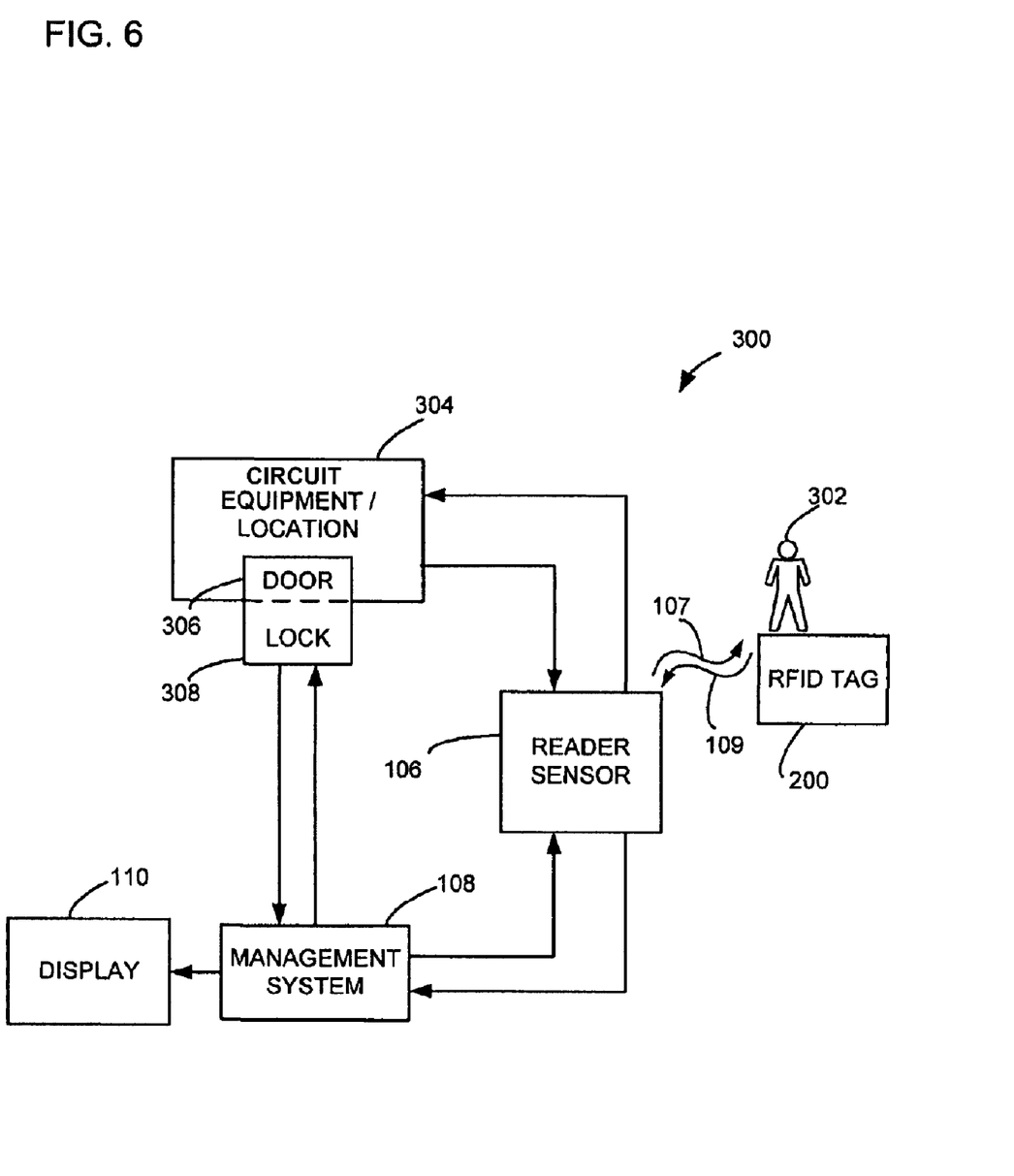
FIG. 6 is a schematic diagram of a system for the management of the use of protective gear potentially hazardous work environments.

In another aspect of the present invention, the RFID assembly 200 may be used to monitor individual employees and grant or restrict access to certain equipment or locations. Exemplary embodiments may be particularly useful in restricting access to hazardous workspaces to certain individuals having a particular training or experience level. As shown in FIG. 6, in one embodiment an RFID reader 106 and/or management system 108 can be configured to communicate with a locking mechanism 308 attached to a door 306 for a specific workspace or piece of equipment 304. In this aspect of the invention, the sensor can prevent access to individuals 302, and/or alert management to the presence of certain individuals in close proximity to certain equipment 304, based upon the signal from the RFID device 200. The management system can include a display 110 to allow a supervisor or management team member to document a worker's access or denial of access to a workspace or piece of personal protective equipment. The display may identify the individual seeking access, the level of personal protective equipment being worn, particular training, and/or security access of the individual.

Figure 7:
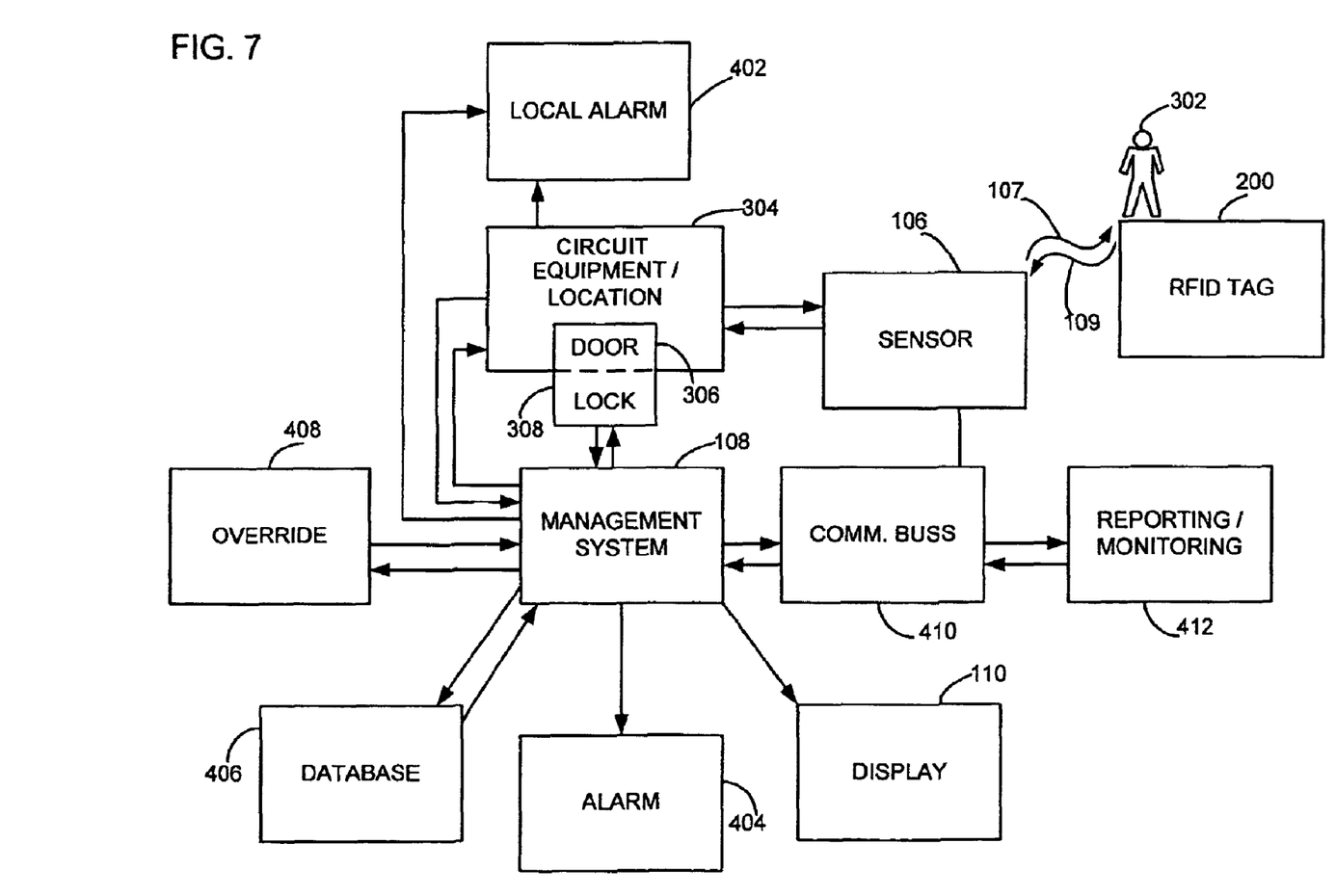
FIG. 7 is a schematic diagram of a system for the management of the use of protective gear potentially hazardous work environments.

FIG. 7 shows another embodiment of the present invention employing means for recording access data and alarms to alert appropriate personnel of an attempted access to a workspace. In this exemplary embodiment, an access point or entry to a workspace or piece of equipment 304 may be coupled to an RFID reader 106. The reader 106 sends a signal 107 to the RFID assembly 200 which, as previously described, can be carried or sewn into the clothing or personal protective equipment of worker 302. The RFID assembly 200 then generates a return signal 109, which is received by the reader 106.

The equipment or workspace 304 to which the RFID reader 106 may be electronically coupled can include a door or access point to the workspace 306 and a lock coupled thereto 308. The door lock can be operated automatically based upon a signal from the RFID reader 106 and/or electronically coupled to a management system 108.

The management system 108 can be integrated with a variety of associated devices and peripheral equipment. A local alarm 402 may preferably be directly coupled to the equipment or workspace 304, and may also be coupled to the management system 108. Upon attempted entry by an unauthorized individual, or an individual that is not wearing the proper protective gear, the local alarm 402 can be set off. The local alarm 402 preferably includes an audible alarm, but may instead, or in addition, include a visual alarm (not shown), such as for example, a flashing light.

The management system 108 may also be coupled to a remote alarm 404 which, similar to the local alarm 402, can be set off based upon an attempted entry by an unauthorized worker or a worker not wearing the proper protective gear. The remote alarm may be located in any desired location, such as for example, a command center, a manager's office, or in another workspace. In addition, the management system 108 may also be electronically coupled to a display which can display a variety of data associated with the attempted entry into the workspace, including, but not limited to, the time and date of the attempted entry, the identity of the worker, and the personal protective equipment 102 being worn at the time of the attempted entry. This information may also be supplied and stored by database 406 or may be communicated via communication bus 410 to a remote location or as a report 412.

The management system 108 may be coupled to an override system 408 which can receive a signal of a "lock out" event due to a worker's identity or lack of personal protective equipment 102. The override system 408 may be programmed to override the "lock out" event based upon the identity of the individual or event, or alternately based upon the level of personal protective equipment 102 being worn.

Figure 8:
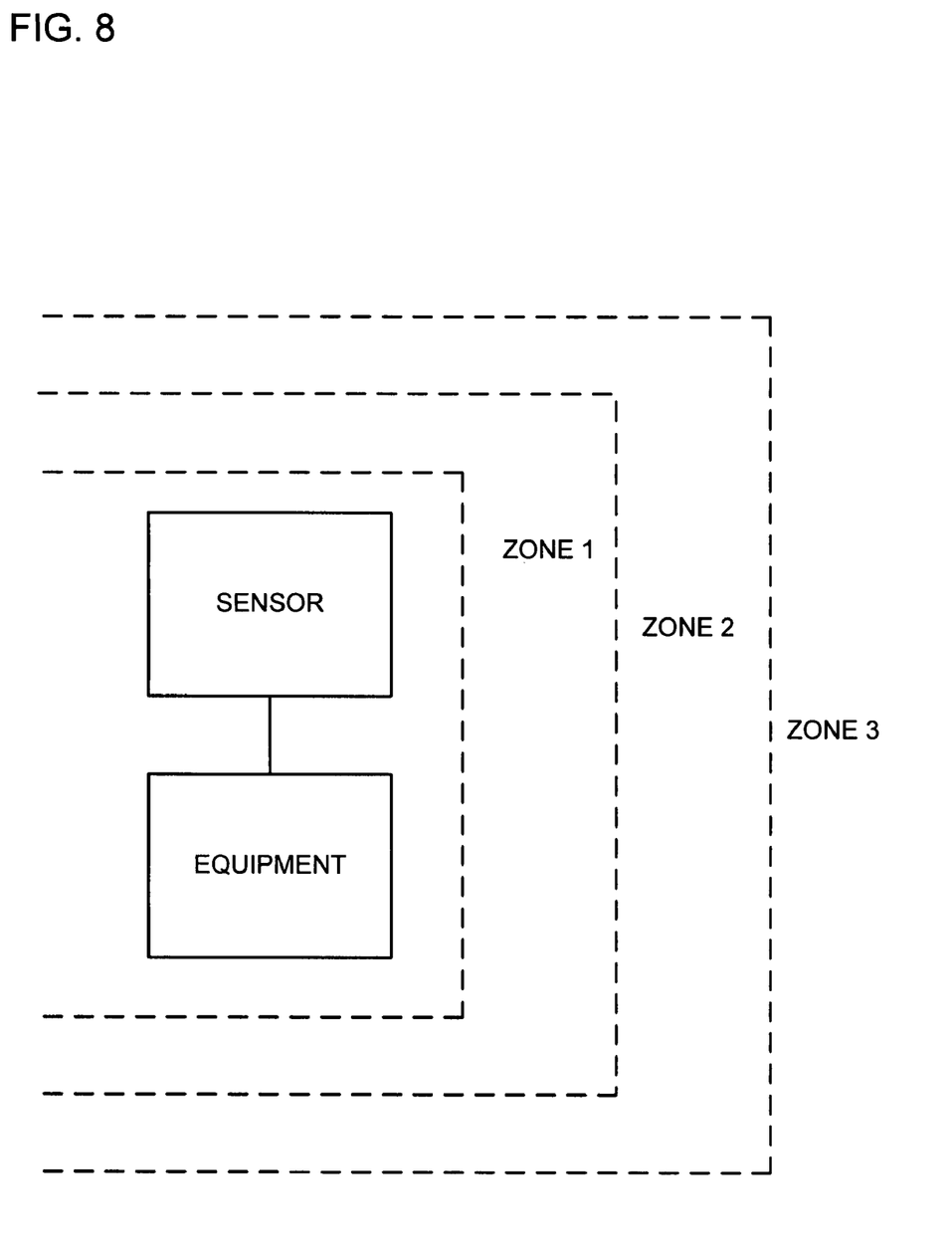
FIG. 8 is a schematic diagram of a system for controlling access to potentially hazardous work environments.

FIG. 8 shows a general schematic of a piece of equipment or location having a RFID sensor for restricted access thereof. The location or equipment may have various zones which may allow a worker to approach within a certain defined distance from a piece of equipment. For example, a hazardous piece of equipment may require an individual standing in Zone 1 to he wearing a certain level of personal protective equipment, whereas an individual standing in Zone 2 may be required to wear a lower level of personal protective equipment, and an individual standing in Zone 3 may be required to wear an even lower level of personal protective equipment. The sensor may be coupled to a display and may alternately be coupled to an alarm system. With such a system, multiple workers may be in the same workspace, while the system monitors the presence of individuals based upon the level of personal protective equipment they are wearing.

A failsafe device may also be employed in addition to the RFID sensor system described herein and may include a pressure sensitive mat positioned directly in front of a piece of hazardous equipment such that the equipment cannot be approached by a worker without the mat being stepped on. Preferably, the pressure sensitive mat is coupled to an alarm, and may optionally be coupled to a display and/or a database to record events wherein a worker steps on the mat, thereby triggering an alarm. In some embodiments, the pressure sensitive mat may be electronically coupled to an RFID sensor and a lockout device such that if the mat is stepped on by a worker prior to the RFID sensor determining that an individual is wearing proper personal protective gear, the mat can send a signal to the lockout device to prevent access thereto. Preferably the pressure mat is adequately sensitive that a weight of greater than 50 pounds is sufficient for the mat to sense the presence of a worker.

In certain instances, specific tools are known to be required for specified service operations. Thus, in another aspect of the present invention, the RFID assembly 200 can be used to restrict access based upon the particular tool which an individual is carrying. The tools can include an RFID tag which an RFID sensor can identify to determine if the tool is appropriate for the service operation to be performed. For example, an RFID tag and RFID sensor may be employed to determine if an individual is carrying an insulated or non-insulated tool, and access granted or restricted based upon whether the individual is carrying an insulated tool. In another example, access may be granted or denied based upon whether an individual carrying testing equipment has test equipment which is properly rated for the equipment being serviced.

Generally, one aspect of the present invention is to protect maintenance personnel during service operations of hazardous equipment by restricting access when the proper protective equipment 102 is not being worn.

In another aspect, the present invention can be employed as an additional level of security by restricting access to specified workspaces depending upon the individual, or the level of personal protective equipment an individual is wearing. In a general sense, security at a location is the function of several factors, including the use of RFID tags and sensors tags to monitor and regulate access of individuals to specific areas.

In this exemplary embodiment, an RFID sensor can be configured to communicate with a lock out device associated with a door or other means of entry into a particular workspace. For example, the sensor can be used to determine whether a particular individual should be granted access to the workspace. In this regard, if an individual is not in possession of an RFID sensor, or if the individual is not in possession of an RFID sensor which has been previously identified as allowable, access will not be granted to the particular workspace. In one embodiment, the RFID sensor and lockout device may be connected to a computing device which may keep a record of all RFID devices which are brought in close proximity to the RFID sensors.

Figure 9:
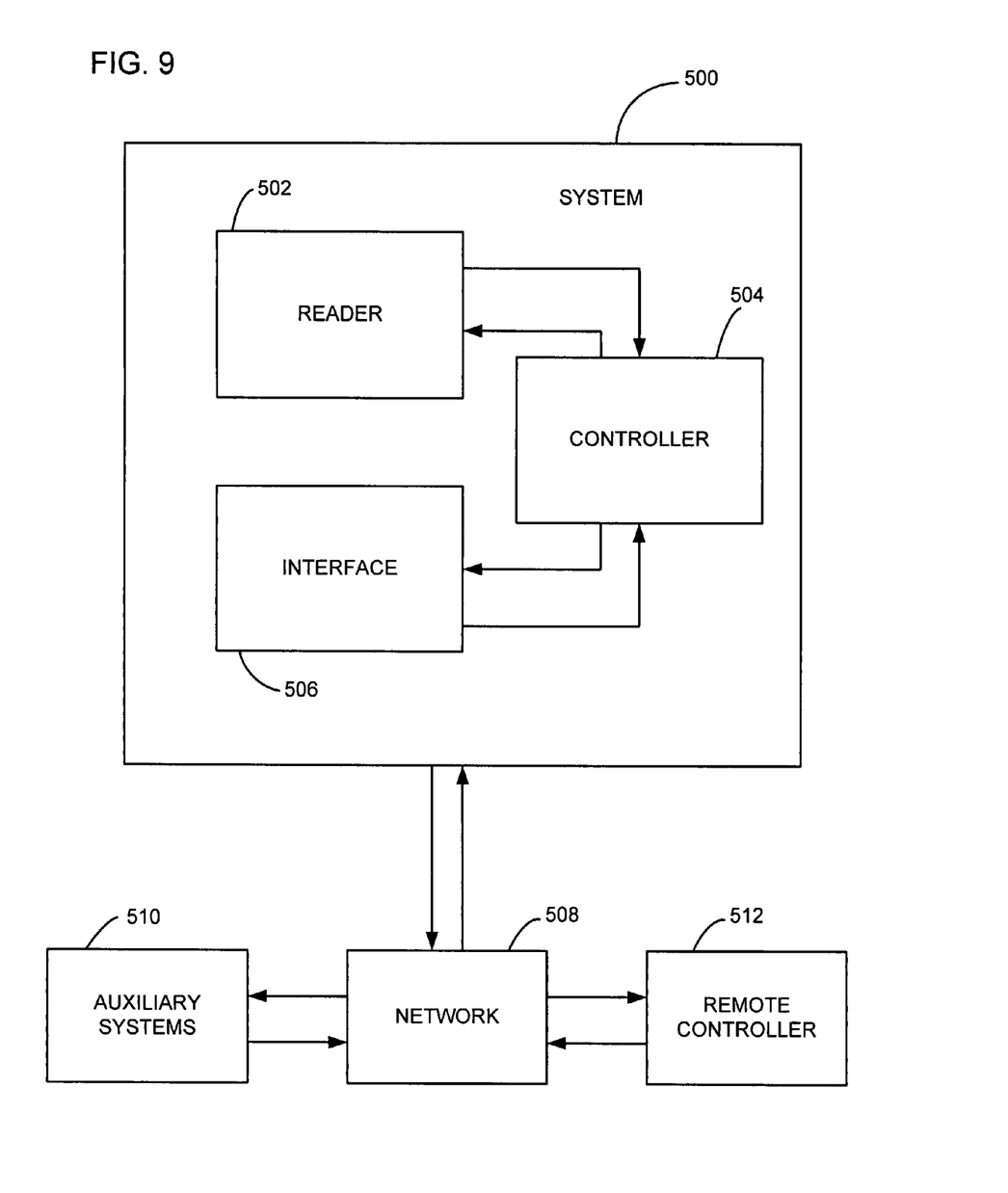
FIG. 9 is a schematic diagram of a system for accessing a system for the management of access to potentially hazardous work environments.

As shown in FIG. 9, in one exemplary embodiment the present invention provides an access control system 500 which includes a reader 502, a controller 504 and an interface 506. Reader 502 can be an RFID sensor, as previously described herein, which can be configured to detect and communicate with RFID tags to monitor the presence of individuals in close proximity to the sensor. Controller 504 can be a processor based controller, or alternatively can be a programmable logic controller. Preferably, controller 504 is a programmable logic controller suitable for use in high temperature or dusty conditions, or in the presence of excessive electrical noise or vibration. Controller 504 is in communication with an interface 506, allowing for data to be accessed, permissions to be set on the RFID sensor and the like. Preferably, the interface 506 is located at a piece of equipment or at a door location, allowing personnel to access the controller, or the computer network at a particular location. In one embodiment, the interface may be located at a particular piece of equipment and individuals servicing the equipment may access data related to the service operation being performed at the equipment. The access control system 500 is connected to a processor based network computer 508, providing remote access thereto. The network computer 508 is connected to a controller 512, which can be located at a remote location and accessed over the network or via the internet. In addition, the network computer 508 can be connected to a variety of auxiliary systems 510, such as for example, alarm systems, secondary controllers, computer based processors, databases and the like.

In one embodiment, one auxiliary system 510 to the access control system 500 can include a reporting module (not shown). The reporting module can be configured to generate a variety of reports, including but not limited to, work logs, activity reports, maintenance reports, training records, and the like. Preferably, the reporting module may be programmed to generate customized reports. In one embodiment, the reporting module may be accessed over the internet.

The various embodiments discussed herein can also include InVision software, allowing the RFID devices to be coupled to and accessed from handheld devices. The InVision software and communication systems are described in the following patents, each of which are incorporated by reference in their entirety: U.S. patent application Ser. No. 10/828, 048, filed on Apr. 20, 2004, published on Oct. 20, 2005, entitled, "Wireless Communication Fuse State Indicator System And Method;" U.S. patent application Ser. No. 10/973,628, filed on Oct. 26, 2004, published on Apr. 27, 2006, entitled, "Fuse State Indicating Optical Circuit And System;" U.S. patent application Ser. No. 11/223,702, filed on Sep. 9, 2005, published on Apr. 13, 2006, entitled "System and Method for Circuit Protector Monitoring and Management;" and U.S. patent application Ser. No. 11/224,526, filed on Sep. 12, 2005, published on Apr. 27, 2006, entitled, "Circuit Protector Signal Transmission, Methods And Systems."

The various embodiments discussed herein can also include a variety of passive and/or active devices for communication with the sensor means, which can be used along with, or instead of, the RFID sensor. Suitable communication means can include, but are not limited to, radio frequency devices, infrared devices, magnetic based sensors, electromagnetic based sensors, acoustic means, chipless RFID devices, and standing acoustic wave (SAW) devices. Optionally, multiple communication means can be employed together.

In one aspect of the present invention, the system can be configured such for the use of "smart cards" to monitor access to hazardous equipment and/or the use of personal protective equipment 102. In one embodiment, an individual is issued a smart card access card. The smart card can include a variety of means for being sensed by a smart card reader, including RFID. Preferably, the smart card is configured for use without physically contacting the card reader.

In one embodiment, an individual seeking to access and check out personal protective equipment scans a personal smart card at a location wherein the personal protective equipment 102 is stored. Preferably, the scanning of the smart card is done with an smart card scanner, which may include an RFID sensor. Preferably, the scanning is a contactless process. After putting on the personal protective equipment 102, the individual then attempts to access a specific location or piece of equipment which requires a particular level of personal protective equipment 102. At the access point, the individual may scan a personal smart card containing, inter alia, the identity of the individual, and may also scan a second smart card coupled to or associated with the personal protective equipment 102. The smart card scanner can then access a control module which determines whether the individual has the minimum appropriate personal protective equipment 102 and whether the individual has been granted access to the space and/or the equipment. In another embodiment, the control module may determine if the individual has proper training to service a particular piece of equipment. In certain embodiments, the identity of the individual may obtained via the RFID tag with an RFID sensor, as previously discussed herein.

In another embodiment, an individual is issued a personal smart card, and uses the smart card to check out adequate personal protective equipment 102 to access and service a particular piece of equipment. The smart card may include an RFID tag which can be read with an RFID sensor, thereby eliminating the need for physically "scanning" the card. In this embodiment, the card may be sensed by waving the card in front of a sensor.

The smart card may be scanned to allow access to the particular equipment. The proximity sensors, which allow for the smart card to be sensed at a distance of up to 12 inches, preferably within 8 inches. The smart card reader thereby eliminates the need for an antenna system, and the complexity that comes with such a system. In alternate embodiments, the smart card may employ a bar code which may be scanned by readers which may be coupled to the access points to the equipment.

III. Exemplary Embodiments of Sensor Tags

Exemplary embodiments of inductor assemblies that may be used as the sensor tags 104 for the system 100 (FIG. 1) are described below that utilize precision winding technology to provide a strong signal response and desired center frequency, also referred to as resonant frequency, with resonant circuit quality factor in a compact size or miniature size of less than, for example, 25 mm in length. Other sizes of the sensor tag 104 are also contemplated herein, such as for example, less than 15 mm in length, less than 20 mm in length, less than 30 mm in length, and less than 50 mm in length. The inventive inductor assemblies are therefore well suited for use as electromagnetic sensor tags 104 and are fully capable of delivering superior signal strength and about 100% detection accuracy when used to monitor and detect, for example, personal protective equipment 102, with known reader systems. Inductor assemblies of the present invention can also be manufactured at lower cost than known inductive tags used in conventional RFID applications.

Figure 3:
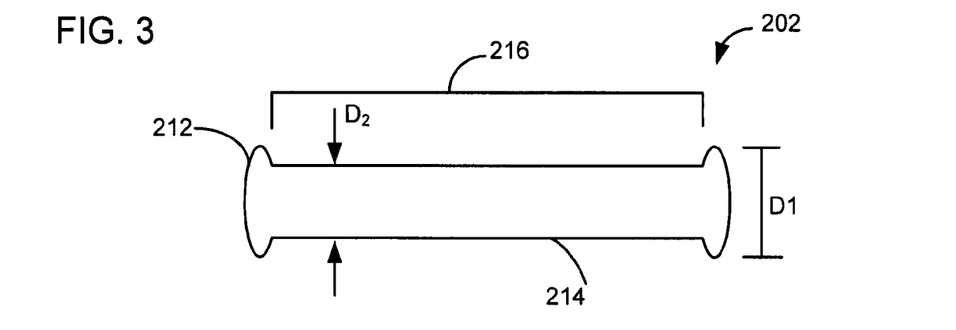
FIG. 3 is a front elevational view of an inductor assembly, at a first stage of manufacture, that may be used as a sensor tag for the system shown in FIG. 1.
Figure 4:
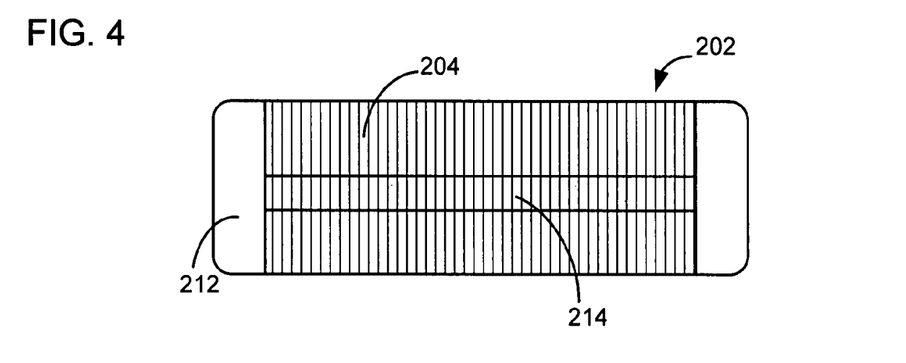
FIG. 4 is a front elevational view of the inductor assembly shown in FIG. 5 at a second stage of manufacture.
Figure 5:
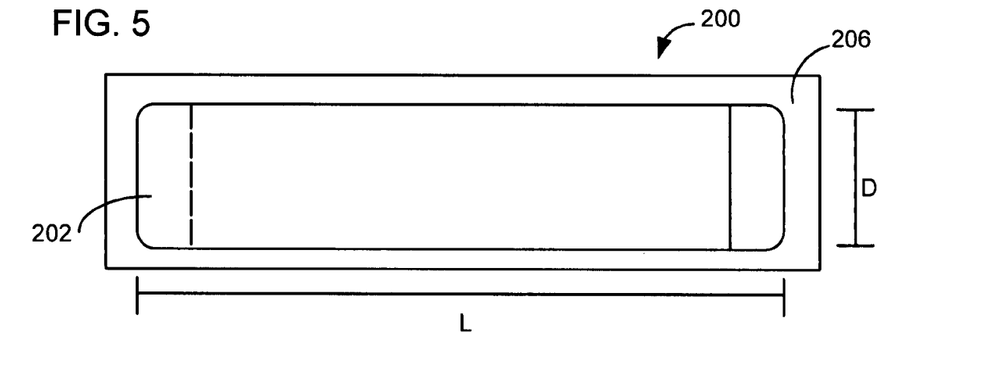
FIG. 5 is a front elevational view of the inductor assembly shown in FIG. 3 at a third stage of manufacture.

Referring now to FIGS. 3-5, an inductor assembly 200 utilizes a magnetic core 202 (FIG. 3), a coil winding 204 (FIG. 4), and a protective element 206 (FIG. 5).

In an illustrative example, the inductor assembly 200 may be formed into a generally cylindrical shape with rounded ends reminiscent of medicine capsules and pills. The assembly 200 may have, as shown in FIG. 5 for example, an overall length L of about 20 mm or less, 15 mm or less, 12.5 mm or less, or 10 mm or less, and an overall diameter D of about 8 mm, 7 mm, 6 mm, 5 mm, 4 mm, 3 mm or less. Preferably, the assembly has an overall length of approximately 12.5 mm and an overall diameter of approximately 3.8 mm. With such a miniature or compact size, the inductor assembly 200 may attached, bonded, embedded, secured or otherwise coupled to personal protective equipment 102 without impacting the use, look, or feel of the equipment as it is worn. While exemplary dimensions are disclosed for the assembly 200, it is contemplated that the assembly 200 may be fabricated in different shapes and geometries having greater or lesser overall dimensions in alternative embodiments.

Referring now to FIG. 3, the core 202 may be fabricated from a magnetic media or material such as ferrite according to techniques known in the art, and more particularly from MnZn or NiZn ferrite in an exemplary embodiment. In one embodiment, the core 202 is formed into a bobbin or spool shape having opposed lateral flanges 212 defining disk-like cylinders of a first diameter $D_1$ and a central cylindrical axial portion 214 extending between the lateral flanges 212 and having a diameter $D_2$ that is less than $D_1$. The reduced diameter $D_2$ of the central portion 214 defines a winding space 216 between the lateral flanges 212.

In an illustrative embodiment, the central portion 214 is elongated and extends for a predetermined axial length or distance between the flanges 212. In cross section, as seen in FIG. 3, the core 202 is bilaterally symmetrical and resembles the shape of a capital I, and is sometimes referred to as a rod core or drum core. In an alternative embodiment, other shapes and geometries of the core 202 may be used in lieu of the bobbin core configuration shown in FIG. 3 as desired.

Referring now to FIG. 4, the coil 204 is wound over the core 202 and substantially fills the winding space 216 (FIG. 3) between the lateral flanges 212 of the core 202. The coil 204 may be a fine magnet wire having a conductor surrounded with enamel, polyurethane, polyimide, or polyester insulation and the like, for example, forming a flexible wire suitable for magnetic applications. The magnet wire may have, for example, a wire gauge of up to #50 AWG and the wire is wound on the core 202 for a number of turns utilizing known precision winding techniques with carefully controlled winding pitch, winding tension, diameter of wire, and the thermal coefficient of expansion of the wire material used, all of which avoids winding parasitics and achieves consistent and repeatable self-resonance frequencies when the coil 204 is excited with a predetermined input signal. Precision control of the winding process enables the inductor assembly 200 to consistently be excited at a very narrow bandwidth that permits accurate detection by the reader. In one embodiment, the coil 204 is formed in a manner that provides sufficient signal strength for reliable signal transmission and detection the assembly 200 within an operating distance of, for example, 12 to 18 inches away from a standard non-optical reader known in the art.

Referring now to FIG. 5, a protective element such as a winding wrapper 106 extends upon and substantially surrounds the coil 204 (FIG. 4) on the core 202. The wrapper 206 forms a protective barrier around the coil 204 and maintains the wound coil 204 in place relative to the core 202. The wrapper 106 may be, for example, a polyester tape that is directly bonded or adhered to and in intimate contact with the outer surfaces of the coil 204 and the flanges 212 of the core 202.

It is contemplated that other protective elements, with or without bonding agents and adherents, may be employed in lieu of wrapping tape in alternative embodiments while accomplishing a similar effect. For example, protective sleeves may be provided such as a polyvinylchloride (PVC) or polymer based material into a hollow tube having an internal diameter dimensioned to extend over the coil 204 and exposed portions of the core 202. Encapsulants or coatings may likewise be utilized to protect the coil 204 and core 202 in use. Preferably, the encapsulants or coatings are sufficient to allow the personal protective equipment 102 to be washed a plurality of times without affecting the performance of the RFID tag.

Depending on the configuration of the coil 204 used to fabricate the assemblies 200, the frequency response of the assembly 200 may be varied. In one example, the assemblies 200, and specifically the coils 204 are constructed to produce a frequency response in the range of 500 to 600 mhz. Within this range, multiple frequency bands may be chosen to identify different levels and grades of personal protective equipment, with each of the coils 204 being designed to resonate within one of the frequency bands when exited by a reader. In one example, a number of different frequencies are chosen to represent each different levels of personal protective equipment, and each assembly 200 is constructed to exhibit a resonant frequency response that uniquely corresponds to one of the different levels. Each successive level of personal protective equipment may withstand, for example, a higher level of incident energy in an arc flash due to the thickness of fabric and material worn. Because each piece of personal protective equipment 102 includes one of the assemblies 200 with a frequency response corresponding to one of the different levels, the level of the protective equipment becomes self-identifying to the system.

In another embodiment, the RFID sensor has a resonant frequency of less than 1 KHz, preferably between approximately 10 and 200 KHz, more preferably approximately 125 KHz. In another embodiment, the RFID sensor has a resonant frequency of greater than 125 KHz. In another embodiment, the RFID sensor has a resonant frequency of between approximately 1 MHz and 1 GHz, preferably between approximately 10 and 100 MHz. In another embodiment, the RFID sensor has a resonant frequency of approximately 900 MHz. In another embodiment, the RFID sensor has a resonant frequency of greater than 1 GHz, preferably approximately 2.4 GHz. In one example, the RFID sensor may operate at a frequency of approximately 2.4 GHz, which may be particularly suited for the use of smaller antennas. In another example, the RFID sensor may operate at a frequency of approximately 13.6 MHz. In another example, the RFID sensor may operate at a frequency of approximately 12 KHz, which may be particularly suited for use with large loop antennas. In another exemplary embodiment, the RFID sensor may operate a standard or global frequency, as defined a standards organization for RFID applications.

While specific signal ranges have been described, and exemplary numbers of grades or levels of personal protection have been referenced above, it is understood that the inductor assemblies may be manufactured to provide resonant frequencies at still other frequencies, and that greater or fewer numbers of levels of personal protective equipment may be provided in other embodiments. Also, while specific types and items of personal protective equipment 102 have been described, it is understood that other items and other types of protective gear may be provided with the sensor tags 104 to obtain the significant benefits of the system as described. Specifically, personal protective equipment 102 directed to hazards other than arc flash may be addressed by the system substantially as described with the exception of the risk assessment analysis for each work site and task. Arc flash incidents are but one example of potential hazards that render personal protective equipment 102 advisable for workers.

In one embodiment, the present invention allows for personal protective equipment to be retrofit to be include RFID tags which can be used with the RFID sensor of the present invention. For example, the RFID tags may be sewn, glued, or attached to the PPE by known means to ensure secure installation of the RFID tag. Preferably, the means of attachment are sufficient to ensure that the RFID tag cannot be easily removed and will remain in place after multiple washings or wearings.

Having now described the inductor assembly 200 defining the sensor tags 104 in detail, and basic operation and methodology of the system 100, implementation of the system to achieve specific objectives is believed to be a matter of programming that is within the level of ordinary skill in the art.

V. Conclusion

Multiple embodiments of the inventive systems, methods and sensor tags for ensuring the proper use of personal protective equipment 102 for potentially hazardous working environments have now been explained and the benefits of the invention are believed to be amply demonstrated.

While the invention has been described in terms of various specific embodiments, those skilled in the art will recognize that the invention can be practiced with modification within the spirit and scope of the claims.

What is claimed is:

1. An access control safety system for a plurality of workers servicing electrical circuitry in an electrical power system without de-energizing the electrical circuitry, wherein at least a first set and a second set of personal protective equipment is provided for use by each of the plurality of workers tasked with servicing an electrical panel in the electrical power system, the first set including at least one item of protective equipment providing a first level of thermal insulation to a part of the worker's body, the second set including at least one item of protective equipment providing a second level of thermal insulation to a part of the worker's body, the first level of thermal insulation being different from the second level of insulation whereby the first and second sets of personal protective equipment provide different levels of protection to the respective plurality of workers while servicing energized electrical circuitry in the electrical panel, and the first and second sets of personal protective equipment each being provided with a respective equipment sensor tag configured to uniquely identify the first and second sets, wherein the system comprises:

a lockout device being normally closed to prevent physical access to the circuitry in the electrical panel by any of the plurality of workers;

at least one electronic detector configured to identify the first and second equipment sensor tag when either of the first and second sets of personal protective equipment are brought within a predetermined spatial distance from the electrical panel by the worker; and a processor-based device in communication with the lockout device and the detector, the lockout device operatively responsive to the processor-based device, and the processor based-device configured to:

determine, based on whether the first or second set of personal protective equipment have been identified and in view of the potential arc flash energy intensity for the circuitry to be serviced in the electrical panel, whether the identified equipment tag and corresponding set of personal protective equipment provides a sufficient degree of protection if an arc flash incident were to occur while the energized circuitry is being serviced; and if the sufficient degree of protection is provided, operate the lockout device to allow physical access to the energized circuitry in the electrical panel;

wherein each of the plurality of workers is assigned to one of a plurality of predefined working zones while the energized circuitry is being serviced, the plurality of working zones being different from one another and at least one of the zones requiring a worker assigned thereto to remain at least a predetermined spatial distance from the panel, the processor-based device being further configured to determine whether the sufficient degree of protection is provided for each worker based upon the zone that each worker is assigned to while the energized circuitry is being serviced; and wherein the possible arc flash energy intensity exposure to each of the plurality of workers is dependent on the respective working zone to which each worker is assigned, and wherein the sufficient degree of protection for a first one of the plurality of predefined working zones is different from the sufficient degree of protection for a second one of the plurality of predefined working zones, the processor-based device further configured to determine whether the sufficient degree of protection is provided for each worker present in the first and second ones of the plurality of predefined working zones.

2. The system of claim 1, wherein the electrical panel includes a door obstructing physical access by the worker to the energized circuitry in the electrical panel, the processor-based device configured to operate the lockout device to lock the door closed unless the sufficient degree of protection is determined for each worker present in the first and second ones of the plurality of predefined working zones.

3. The system of claim 1, wherein the electrical panel includes at least one circuit protector, the potential arc flash energy intensity corresponding to electrical conditions present at the location of the at least one circuit protector in the panel.

4. The system of claim 3, wherein the at least one circuit protector is a fuse, and wherein the potential arc flash energy intensity relates to a possible arc flash incident while the worker is replacing the fuse.

5. The system of claim 1, wherein each of the first and second sets of personal protective equipment includes one or more of a hard hat, a face shield, a flame resistant neck protector, an ear protector, a protective suit, an insulated rubber glove, an insulated piece of footwear, and an insulated tool.

6. The system of claim 1, wherein the processor-based device is further configured to:

accept a task code for a service procedure to be performed by at least one of the plurality of workers in the electrical panel; and recommend to the at least one worker which of the first and second sets provides the sufficient degree of protection.

7. The system of claim 1, wherein each of the plurality of workers is provided with a respective identification sensor tag to uniquely identify each of the plurality of workers, and the detector is further configured to:

identify each worker present within a predetermined spatial distance from the electrical panel; and determine whether the set of personal protective equipment possessed by each identified worker provides the sufficient degree of protection.

8. The system of claim 7, wherein the processor-based device is further configured to determine whether the set of personal protective equipment possessed by each identified worker provides the sufficient degree of protection based upon a spatial proximity of each identified worker to the electrical panel.

9. The system of claim 1, wherein the at least one electronic detector is mounted stationary to the electrical panel.

10. The system of claim 9, wherein the electrical panel includes a door, the at least one electronic detector mounted to the door.

11. The system of claim 1, wherein the processor-based device is proximate the at least one electronic detector.

12. The system of claim 1, wherein the processor-based device is remotely located from the electrical panel.

13. The system of claim 1, wherein the at least one electronic detector comprises a plurality of electronic detectors positioned at different elevations to detect specific items of protective gear in each set of equipment that protect specific parts of each worker's body.

14. The system of claim 1, wherein the electrical power system includes a plurality of electrical panels, each of the electrical panels being associated with a respective one of the plurality of electronic detectors and the processor based device communicating with each one of the plurality of electronic detectors.

15. The system of claim 1, wherein the processor based-device is further configured to implement at least one of a manual and automatic over-ride in the event of a malfunction or emergency.

16. The system of claim 1, further comprising at least one of a local alarm and a remote alarm operable when the sufficient level of protection has not been determined.

17. The system of claim 1, further comprising a failsafe device proximate the electrical panel, wherein the worker cannot approach the electrical panel while avoiding the detector and the processor-based device.

18. The system of claim 17, wherein the failsafe device is a pressure-sensitive mat.

19. The system of claim 17, further comprising an alarm associated with the failsafe device.

20. The system of claim 1, wherein the detector is further configured to detect an insulated tool carried by at least one of the plurality of workers, and the processor-based device is further configured to determine whether the insulated tool is properly rated for the energized circuitry in the electrical panel to be serviced.

21. The system of claim 1, further comprising a display.

22. The system of claim 21, wherein the display is touch sensitive.

* * * * *